UNITED STATES PATENT OFFICE.

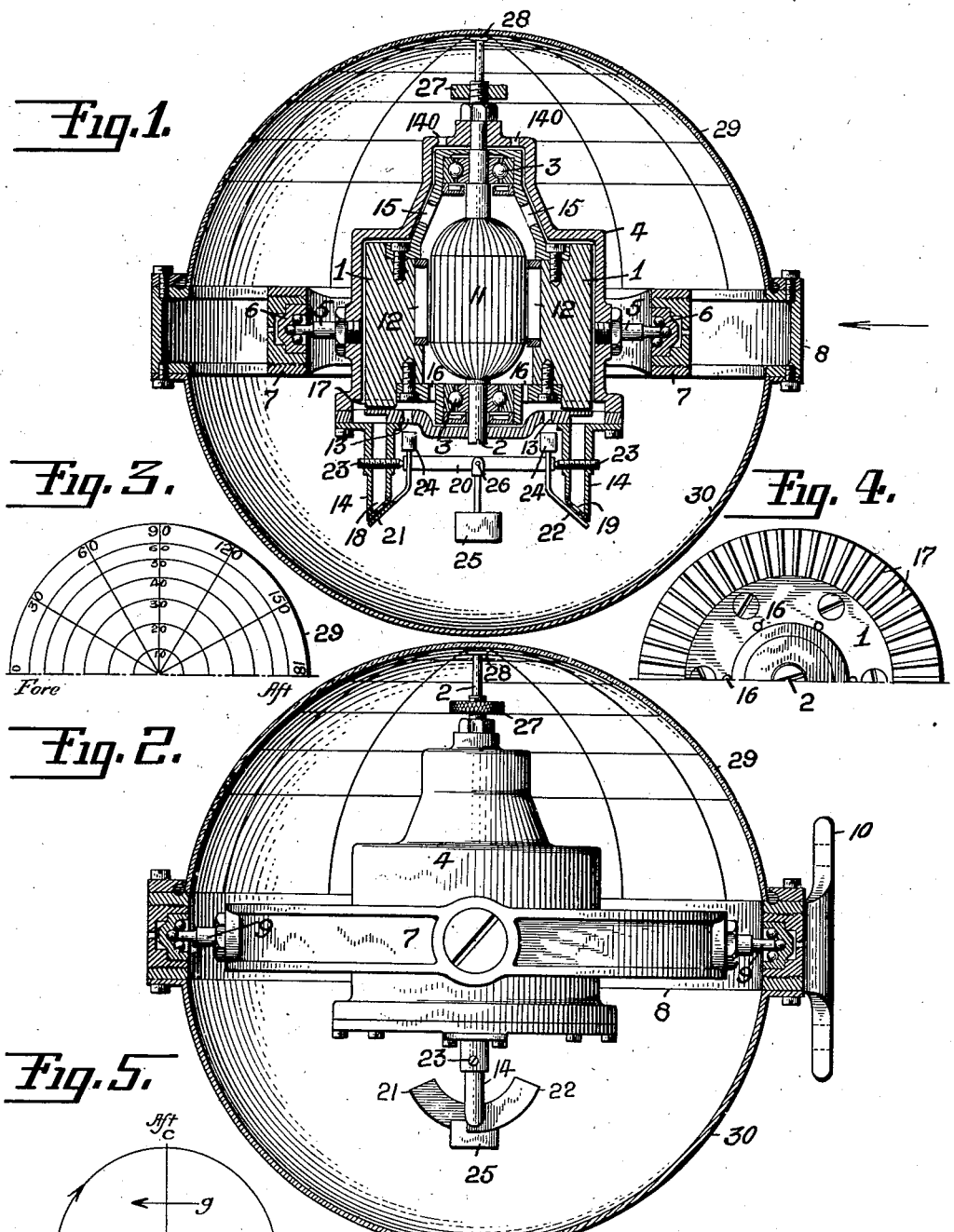

MORRIS M. TITTERINGTON, OF BROOKLYN, NEW YORK, ASSIGNOR TO THE SPERRY GYROSCOPE COMPANY, OF BROOKLYN, NEW YORK, A CORPORATION OF NEW YORK.

SELF-DAMPING GYRO-PENDULUM.

1,324,482.     Specification of Letters Patent.     Patented Dec. 9, 1919.

Application filed March 15, 1918. Serial No. 222,546.

*To all whom it may concern:*

Be it known that I, MORRIS M. TITTERINGTON, a citizen of the United States of America, residing at 164 Remsen street, Brooklyn, in the county of Kings and State of New York, have invented certain new and useful Improvements in Self-Damping Gyro-Pendulums, of which the following is a specification.

This invention relates to gyroscopic pendulums of the type employed to establish a fixed reference line or plane on aircraft, ships, automobile torpedoes or other vehicles. More specifically the invention relates to an improved form of damping means for such pendulums.

One of the principal objects of the present invention is to provide a means carried by the gyro frame or housing for exerting a damping torque on the pendulum without causing unequal pendulosities of the latter about different axes.

A further object is to provide a common means for cooling the gyro driving motor and for supplying the damping forces or torques. Further objects and advantages will appear as the invention is hereinafter developed.

Referring to the drawing which illustrates what I now consider the preferred forms of my invention:

Figure 1 is a sectional elevation of one form of my invention.

Fig. 2 is a similar view taken at right angles to that of Fig. 1, looking in the direction of the arrow.

Fig. 3 is a top plan view of the portion of the upper transparent cover shown in Fig. 2.

Fig. 4 is an inverted plan view of the gyro rotor, one half being cut away.

Fig. 5 is a diagrammatic view employed in describing the operation of my invention.

My damped pendulum is capable of various applications, such as stabilization control, as an inclinometer, etc. In order to avoid multiplicity of views and surplusage in description, I have illustrated only the application to an inclinometer.

Referring to the drawings it will be seen that the gyroscopic rotor 1 is rotatably mounted about a normally vertical spindle 2 by means of ball bearings or other antifriction bearings 3, 3. The spindle 2 is secured to a frame or housing 4 universally mounted about horizontal axes. This universal mounting may be accomplished by providing said housing 4 with horizontal pivots 5, 5 rotatably mounted, preferably by means of ball or other antifriction bearings 6, 6, in a gimbal ring 7, which in turn is similarly mounted for oscillation or rotation with respect to a ring 8 about horizontal pivots 9, 9 at right angles to said pivots 5, 5. The ring 8 may be provided with a bracket 10 which may be secured to the aircraft or other support.

The rotor is preferably propelled by means of an induction motor of which the primary 11 is secured to the spindle 2 within the rotor 1 and of which the secondary 12 is carried by said rotor. Polyphase or other suitable current may be supplied to the stator 11 in any suitable manner.

By making the entire structure carried by the spindles 5, 5 slightly pendulous, it is obvious that the spindle 2 will maintain a substantially vertical position in spite of acceleration forces, provided the gyro pendulum is properly damped. I prefer to provide damping means carried wholly by the housing 4 and constructed substantially as follows:

The air pressure created by the blower action of the rotor 1 may be employed as a source of energy, by providing the housing 4 with properly placed and properly directed orifices. Thus said housing 4 may be provided with inlet openings 13, 13 adjacent the inner periphery of the rotor 1 and with outlets shown in the form of spouts or jets 14 communicating with said housing on opposite sides of spindle 2 adjacent the outer periphery of the rotor. By providing additional openings 140, 15 and 16 in the housing 4 and the spider of the rotor 1, air may be drawn down through the motor 11, 12 to cool the latter. The rotor 1 may be provided with blades 17 to augment the pneumatic pressure produced by rotation of said rotor. One of the spouts 14 is provided with an orifice 18 which is so directed as to produce, when uncovered, a torque about the axis 9—9, in opposition to, but numerically equal to that produced by an orifice 19 in the other jet or spout, when uncovered.

Obviously if both ports or orifices 18, 19 are open to the same extent the resultant torque about the axis 9—9 is zero. If, however, one of said orifices is opened to a greater extent than the other a resultant torque is produced in a direction depending on which of the orifices is wider open. The means for controlling the effective area of these orifices which is preferred by me may be constructed substantially as follows:

A shaft 20 is oscillatably carried by the housing 4 by means of pivot pins 23 screwed into the jets or spouts 14. This shaft carries a plurality of blades or vanes 21, 22 adapted to coöperate with the orifices 18 and 19 respectively. Weights 24 are provided on said shaft 20 to counterbalance the vanes 21, 22. While the vanes 21 and 22 may be so designed that the orifices 18 and 19 would be normally open I have shown the latter normally closed and one or the other thereof adapted to be opened depending on the direction of oscillation of shaft 20 with respect to housing 4. In order to control the orifices on oscillation of the gyro an auxiliary pendulum 25 is pivoted to the shaft 20 for oscillation with respect thereto about a horizontal axis 26 at right angles to the axis of said shaft. It will be seen that the pendulum 25 is universally connected to the housing 4 so that the pendulosity of the entire structure, supported by pivots 5, 5, is the same about all horizontal axes through the virtual point of support. Preferably the parts are so designed that this pendulosity is slight so that the gyro pendulums will have a long period. A nut 27 may be provided on the spindle 2 for the purpose of adjusting the pendulosity.

The operation of my device may best be understood by referring to Fig. 5, which is a diagrammatic plan view of the device as shown in Fig. 1, with the shaft 20 extending perpendicularly to the longitudinal axis of the vehicle on which the device is mounted. Let us assume that the acceleration pressures are acting on the pendulum and the rotor 1 is rotating in such a direction as would produce movement of the top of the spindle 2 in the path $f$. Starting with the top 28 of the spindle 2 at $b$ it will be noted that both orifices 18 and 19 are covered. As the member 28 moves toward $c$ the orifice 19 will be opened, 18 remaining closed, thus causing a damping torque tending to push said member 28 in the direction of the arrow $g$. The last mentioned torque will be maintained until both orifices are again closed when the member 28 reaches $d$. In a similar manner when the member 28 is traveling from $d$ to $b$ through $a$ the orifice 19 is closed and 18 open so that a damping torque will be exerted tending to move member 28 in the direction of the arrow $h$. It is obvious from the above description that oscillations of the gyro pendulum will be quickly and effectively damped out.

I wish to emphasize that it is important, if not indispensable, that the pendulosity of the gyro pendulum be uniform about both horizontal axes, as the stabilization of the spindle 2 is found to be practically destroyed when the pendulosity varies to any considerable extent.

A pair of hemispherical cover plates 29 and 30 may be provided above and below ring 8 and detachably secured to the latter to form a gas-tight, dust-proof, watertight housing for the gyro pendulum. The casing thus formed may contain air or any other suitable gas. As the spindle 2 will maintain a substantially vertical position, the cover plate 29, which is of transparent material, may be calibrated as indicated in Fig. 3, to coöperate with said member 28 to indicate both the numerical value of the angle of inclination and the axis about which inclination is taking place.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a universally mounted gyroscopic pendulum having the same pendulosity about all axes in the horizontal plane through its point of support and comprising a rotor having a normally vertical spinning axis, and means carried by said pendulum for exerting a torque thereon about an axis at an angle to the spinning axis.

2. In combination, a gyroscopic rotor, a universally mounted frame in which said rotor is rotatably mounted and means comprising a pendulum universally mounted on said frame for exerting a torque on the latter.

3. In combination, a gyroscopic pendulum and means comprising a pendulum universally connected to said first named pendulum for damping oscillations thereof.

4. A damped gyroscopic pendulum comprising a rotor, a universally mounted frame rotatably supporting said rotor, a pendulum connected to said frame for oscillation with respect thereto about two axes and means controlled by said pendulum for exerting a torque on said frame.

5. A damped gyroscopic pendulum comprising a rotor, a universally mounted frame rotatably supporting said rotor, a pendulum connected to said frame for oscillation with respect thereto about two axes and means controlled by said pendulum and carried by said frame for exerting a torque on the latter.

6. In combination, a gyroscopic rotor, a universally mounted frame in which said rotor is rotatably mounted, a member carried by said frame for oscillation with respect thereto, a pendulum pivotally connected to said member and means controlled by oscillation of said member for exerting a torque on said frame.

7. In combination, a gyroscopic rotor, a frame mounted for oscillation and rotatably supporting said rotor, a jet carried by said frame, a pendulum universally connected to said frame and means controlled by said pendulum for controlling the orifice of said jet.

8. In combination, a gyroscopic rotor, an electric motor for driving said rotor, a frame in which said rotor is rotatably mounted, a jet carried by said frame, means comprising said rotor for causing a circulation of gas through said motor and for supplying gas to said jet and means controlled by movement of said frame for controlling the orifice of said jet.

9. In combination, a gyroscopic rotor, a universally mounted housing in which said rotor is rotatably mounted, outlets on said housing, a shaft oscillatably mounted on said housing, counterbalanced vanes carried by said shaft adapted to control said outlets and a pendulum pivotally connected to said shaft for oscillation about an axis at an angle to the longitudinal axis of said shaft.

10. In combination, a gyroscope mounted for oscillation about two intersecting horizontal axes and comprising a rotor having a normally vertical spinning axis, and means carried by said gyroscope for exerting a torque thereon about an axis at an angle to the spinning axis.

11. In combination, a universally mounted gyroscopic pendulum having the same period about all axes in the horizontal plane through its point of support, and means carried by said pendulum for exerting a torque thereon about an axis at an angle to the spinning axis.

In testimony whereof I have affixed my signature.

MORRIS M. TITTERINGTON.